ROBERT E. FEARON
INVENTOR.

March 8, 1966 R. E. FEARON 3,239,747
HIGH FREQUENCY ELECTROMECHANICAL ENERGY CONVERSION
Filed Dec. 4, 1961 2 Sheets-Sheet 2

ROBERT E. FEARON
INVENTOR.

BY

— # United States Patent Office 3,239,747
Patented Mar. 8, 1966

3,239,747
HIGH FREQUENCY ELECTROMECHANICAL ENERGY CONVERSION
Robert E. Fearon, Tulsa, Okla., assignor to Harvest Queen Mill & Elevator Company, Dallas, Tex., a corporation of Texas
Filed Dec. 4, 1961, Ser. No. 156,875
5 Claims. (Cl. 322—32)

This invention relates to high frequency electrical systems and more particularly to operations and systems in which mechanical rotational energy is translated into electrical energy with the frequency of the electrical energy independent of the speed of mechanical rotation.

In conventional systems for the generation of high frequency voltages such as radio frequencies employed for communications as well as those for industrial applications such as heating and the like, vacuum tubes and their associated circuits have been relied upon. However, the use of such instrumentalities limits the power potentialities of the system to relatively low values. A relatively short life time of certain of the components is also a limiting factor. Furthermore, the components are characterized by substantial bulk insofar as space requirements are concerned and are costly in their fabrication and, upon use, operation is at relatively low efficiency.

Devices exist in the prior art capable of delivering high energy, high frequency emissions on short duty cycles. However, there is not available a device which can continuously deliver high frequency energy at substantial power levels and at relatively high efficiencies.

It is therefore an object of the present invention to provide a high frequency or a radiofrequency transducer which involves the use of a rotating machine. It is a further object of the present invention to provide a radiofrequency transducer to convert rotational energy into high frequency electrical energy where the frequency of the electrical energy is independent of the speed of rotation of a rotating element.

It is a further object of the invention to provide a high efficiency radiofrequency transducer.

In accordance with one embodiment of the present invention, there is provided an alternating current generator which includes a magnetic structure having an air gap threaded by a magnetic flux. An armature is provided having conductors positioned in the air gap. Mechanical drive means is provided which is coupled to the armature to move the conductors in the magnetic field in the air gap. A circuit means is included which has a first linkage between the magnetic structure and said conductors. The first linkage is adapted for the transfer of alternating current exclusively therebetween. A circuit is provided in electromagnetically coupled relation to the unit for delivery of energy from the transducer.

In a more specific aspect of the invention there is provided an alternating current generator which includes a rotating electrical machine having a prime mover for supplying energy to a driven element associated with a stationary element. A frequency-determining positive feedback circuit means is provided which is operable independent of the frequency of rotation of the driven element for interconnecting the driven element and the stationary element. A circuit is then coupled to the stationary element for delivery of energy from the generator.

In a preferred embodiment of the invention the rotating electrical machine is characterized by a magnetic structure formed from a magnetically permeable, electrically non-conductive material of the type generally known as a ferro spinel.

For a more complete understanding of the present invention and for further objects and advantages thereof, reference may now be had to the following description taken in conjunction with the accompanying drawings in which:

FIGURE 1 diagrammatically illustrates on embodiment of the present invention;

Figure 1:
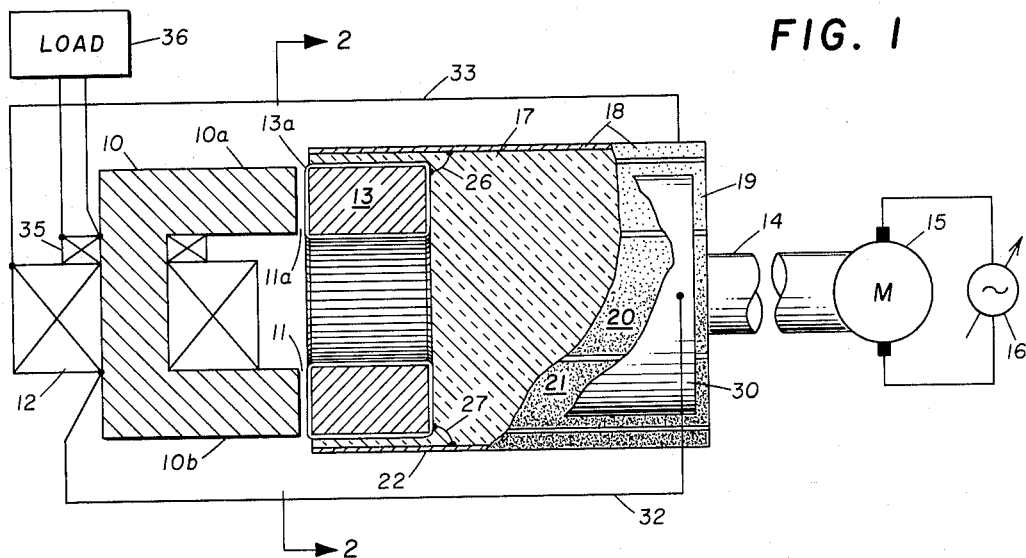
Figure 2:
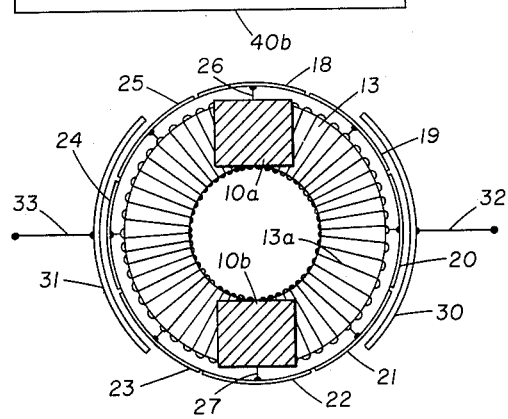
FIGURE 2 is a sectional view taken along lines 2—2 of FIGURE 1.

While there are various forms in which the invention may be embodied, for the purpose of illustration, reference will first be had to FIGURES 1 and 2 in which a simplified embodiment of a generator of a high frequency signal has been disclosed.

In FIGURES 1 and 2 there is provided a magnetic core 10 which is in the form of a C-shaped solid having pole pieces 10a and 10b. A short cylinder 13 of magnetic material is supported adjacent to the ends of the core 10 with air gaps 11 and 11a therebetween. A magnetic flux will be produced which will thread across air gaps 11 and 11a. The magnetic core 10 and ring 13 preferably are formed from a material having high magnetic permeability and very low electrical conductivity. Materials which satisfy this requirement are known under the more familiar trade name as Ferrites and are more accurately identified as ferro spinels.

The magnetic core 10 is provided with a field coil 12. An electrical winding 13a is wound toroidally into the cylinder 13. The turns of the winding are spaced uniformly about the periphery of the armature 13. The winding is closed on itself forming a Gramme ring type armature. The armature 13 is mounted on a body member 17 which in turn is supported by a shaft 14. Shaft 14 is driven by a motor 15, the latter being supplied by a suitable energy source 16. Source 16 has been indicated to be a variable source to control motor 15 so that the energy injected into the system may readily be controlled.

As the motor 15 drives armature 13, the electrical conductors of winding 13a are rotated, thus cutting the lines of flux in the magnetic field in the air gap to produce voltages in the winding 13a.

In this embodiment of the invention the winding 13a is connected at spaced points to longitudinally disposed conductive plates 18–25 arranged on the periphery of the rotating body structure 17. More particularly, the insulating structure 17 is cup-shaped to extend over the winding 13a and preferably is of such character as to exhibit tensile strength thereby to oppose centrifugal forces developed on the windings and on the armature 13 when rotated at relatively high speeds. Fiberglas materials are suitable for this purpose. A plurality of metallic plates 18–25 are coated on or otherwise applied to the exterior surface of the body 17. The plates 18 and 19 are shown in FIGURE 1. The remaining plates 20–25 are shown in FIGURE 2. As best seen in FIGURE 1, the upper plate 18 is connected by way of the linkage 26 to a tap on the winding 13a. The lower plate 22 is connected by way of linkage 27 to a tap on winding 13a diametrically opposed of the connection of the tap 20. As shown in FIGURE 2, sector plates 19–21 and 23–25, located at uniformly spaced points around the periphery of the body 17, are also connected by linkages similar to linkages 26 and 27 to the winding so that the voltage generated upon rotation of the winding 13a will appear at the plates 18–25.

A pair of pick-off plates 30 and 31, FIGURE 1, are mounted coaxially with respect to shaft 14 and the armature 17 as to be in confronting relationship with sector plates 18–25. As best illustrated in FIGURE 2, the plate 30 and plate 31 are arcuate and are positioned symmetrically with respect to a horizontally directed radial line. They are displaced 90° from a vertical radial line along which the pole pieces 10a and 10b of the core structure 10 are located. Plates 30 and 31 are fixedly supported independently of the armature but are maintained closely adjacent thereto to form a capacitive coupling to the armature. By this means the coupling between the armature 13 and the coil 12 is to be non-conductive to unidirectional currents. The plate 30 is connected to one terminal of coil 12 by way of conductor 32. Plate 31 is connected to the other terminal of coil 12 by way of conductor 33. The connections are such that a positive feedback relationship is established between winding 13a and coil 12.

The circuit including the coupling or linkage between coil 12 and winding 13a is tuned to the frequency desired for the electrical output from the generator. More particularly, in one form of the invention the coil 12 is so formed that the inductance thereof and the distributed capacitance therein are such that the resonant frequency thereof is slightly above the desired output frequency. Coil 12 thus forms the primary frequency determining element. The electrical properties of the remainder of the feedback loop together with those of the coil 13 fix or determine the output signal frequency.

With any residual flux existing in the air gaps 11 and 11a, rotation of the armature by motor 15 will result in the generation of a voltage in the winding 13a. The latter voltage having a frequency determined by the resonant frequency of the feedback loop will then appear on coil 12. As a result, a flux dependent upon the feedback energy will appear in the air gap 11a further to increase the voltage in the winding 13a. Through the feedback operation there is built up a voltage in the feedback system such that the energy from the motor 15 is converted into electrical energy. The mechanical energy is translated into electrical energy with the frequency of the electrical energy being independent of the speed of rotation of the armature. The electrical energy may then be delivered from the system by means of a coil 35 which is linked to the core 10. The coil 35 is connected to a load unit 36 generically to represent delivery or extraction in electrical form of the energy of the system supplied by the motor 15.

At a certain threshold speed it will be found that the feedback in the electromechanical loop thus provided is unity and for speeds above that threshold the system will be regenerative. Thus, the motor 15 is so driven that the armature 13 rotates within the magnetic field at speeds such that the device is in the oscillatory region. In such case output currents in the load coil 35 are at a frequency which is independent of speed of the motor 15. The frequency is controlled by the electrical characteristics of the loop including the armature 13 to the coil 12.

At speeds above the point where regeneration of the system initially takes place, the voltage in the conductors 13 will continue to increase until a stable operating condition is achieved. The latter will be where the losses in the system and energy delivered therefrom equal the energy introduced into the system by the mechanical drive from motor 15.

Since the frequency at which the system may be caused to deliver energy to a suitable load device is quite independent of the frequency of rotation of the moving elements in the rotating system, a new and flexible system is provided. High energy may be supplied by rotation of the armature. Such high energy may be translated into electrical signals which are independent of rotational speed. This constitutes a substantial advance in the art of electrical rotating machinery and provides a new and novel source of alternating currents.

From an understanding of the structure illustrated in FIGURES 1 and 2, it will be appreciated that below a fixed value of rotational speed of the armature 13 the feedback loop will not operate as a regenerative device. As will be explained, operation at such low rotational speeds may be advantageous. However, the speed at which the armature 13 must be driven by motor 15 for regeneration is of interest.

As is well understoood by those skilled in the art, the voltage generated in a given conductor may be expressed as:

$$e = Blv \times 10^{-8} \qquad (1)$$

where:
- $e$ is in volts,
- $B$ is the flux density in the field in gausses,
- $l$ is the length of the conductor in centimeters, and
- $v$ is the velocity of the conductor in centimeters per second.

In the structures illustrated, flux density B is dependent upon the magnitude of current generated in the conductors in the armature. More specifically, the total flux in the magnetic core 10 is equal to $$0.4\pi N \frac{I}{R}$$

where:
- $N$ is the number of turns in coil 12,
- $I$ is the current flowing therethrough, and
- $R$ is the reluctance of the magnetic structure 10.

Since the magnetic core 10 is formed of materials which have extremely low loss characteristics and yet are highly permeable, there is provided a basis for a high frequency operation not heretofore available. Structure embodying powdered iron cores have been available in the prior art but their permeabilities are of the order of one-hundredth of that characterizing the ferro spinel materials and thus the latter are particularly adaptable to a successful embodiment of the present invention.

At a given speed, and starting with some residual flux in core 10 either due to the earth's field or due to excitation as by current from an auxiliary source flowing through coil 12 or coil 35, the output voltage may be determined. It is to be noted that the current in the feedback loop may be connected for either positive feedback or negative feedback. Therefore, the proper polarities will be necessary in setting up the initial connections.

Only alternating current components pass through to the coil 12 by reason of capacitive coupling provided by plates 30 and 31, FIGURE 2.

Figure 3:
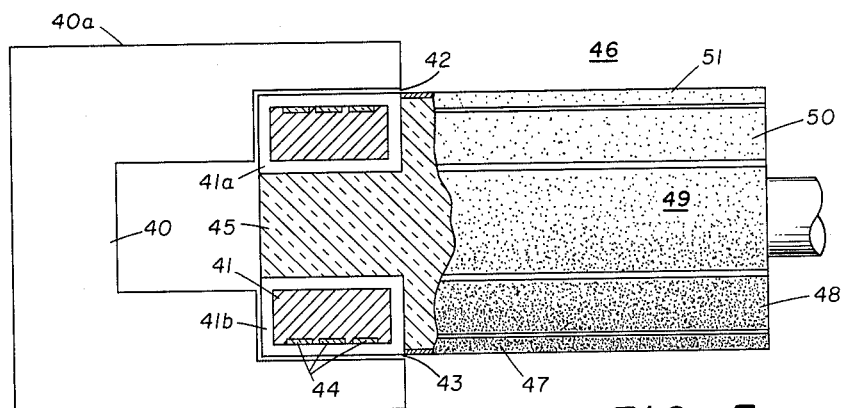
FIGURE 3 illustrates a modification of elements of the system of FIGURE 1.

In the embodiment illustrated in FIGURES 1 and 2 the winding 13a is shown applied to the surface of the cylinder 13. It is understood, however, that it will be desirable to maintain the air gaps 11 and 11a at a minimum in order that the reluctance of the magnetic flux path will be minimum. To this end the winding 13a preferably will be positioned in slots formed in the surface of the cylinder 13 which face the pole pieces 10a and 10b. Furthermore, it may be desirable to extend the pole faces 10a and 10b over the periphery of the cylinder 13 in order to minimize the reluctance of the system and provide for maximum transfer of energy between the elements thereof. For example, in FIGURE 3 there is illustrated a modified form of the invention in which only the magnetic structure and the rotor have been shown. The core 40 has pole pieces 40a and 40b which confront the ends of the cylindrical core 41 as well as the periphery thereof for predetermined portions. The air gaps 42 and 43 are thus of considerably greater areal extent than shown in FIGURE 1. Furthermore in this embodiment of the invention the cylinder 41 has been slotted. Two slots 41a and 41b are illustrated in FIGURE 3 and form recesses into which the conductors forming the rotor winding may be placed. Also illustrated in FIGURE 3 are reinforcing bands 44 which are built into the cylinder 41 to provide strength to oppose centrifugal forces therein. Being embedded within the cylinder, they introduce desired strength but do not occupy space on the surface so that the air gaps 42 and 43 may be made minimal.

In this embodiment the cylinder 41 is mounted on a mandrel 45 which forms a part of the insulating cylinder 46. A plurality of conductive sectors 47, 48, 49, 50 and 51 are shown mounted on the surface of the cylinder 46. In this embodiment the sectors 47–51 and the additional sectors not shown in FIGURE 3 extend only to the edge of the air gaps 42 and 43 rather than the complete length of the rotor structure as in FIGURE 1. However, in this case as in FIGURE 1, the conductors wound on the cylinder 41 are connected at spaced points to the conductive sector plates 47–51 to provide for capacitive coupling to the system. Capacitive coupling, of course, is greatly preferred to a conductive coupling since there is avoided undue wear which is attendant brush contacts. However, it may be possible in some operations embodying the present invention to employ brush contacts together with commutator segments which might generally be oriented as the plates 47–51 of FIGURE 3. It is to be understood that coils will be provided for the core 40 and pick-off plates for commutation as in FIGURE 1 in order to provide a feedback loop for the system of FIGURE 3. However, FIGURE 3 illustrates modifications of the system of FIGURE 1 which enhance the operating properties thereof. In general it may be said that the lower the reluctance in the flux path the lower will be the speed at which regeneration may take place.

Figure 4:
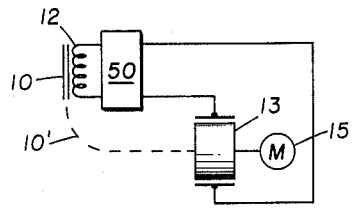
FIGURES 4–7 illustrate four alternative circuit configurations.

In FIGURES 1 and 2 the frequency determining elements have been described as being within the feedback itself. It is to be understood that other means may be employed for controlling the frequency of operation. More particularly with reference to FIGURES 4–7 it will be seen that various frequency determining configurations are possible. For example, in FIGURE 4 the element 50 represents the frequency determining network in the feedback loop and may be considered to include the lumped constants of all of the distributed electrical characteristics of the loop of FIGURE 1. It will be noted in FIGURE 4 that the magnetic linkage between the armature 13 and the core 10 is represented by the dotted line 10'. This is to symbolize for the purpose of FIGURE 4 the linkages effective in the systems of FIGURES 1–3.

Figure 6:
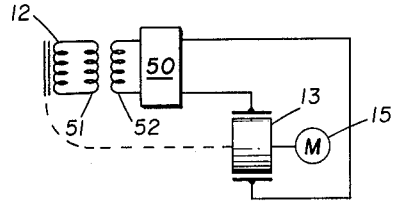
Figure 5:
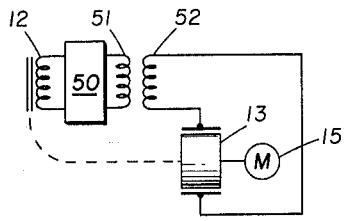
Figure 7:
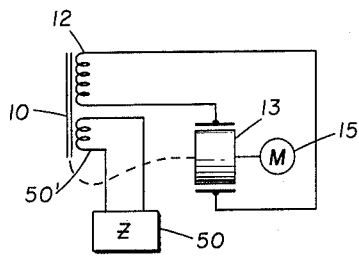

In FIGURE 5 the feedback loop between the armature 13 and the coil 12 includes a transformer coupling including windings 51, 52. In this case the primary frequency determining network 50 is in the loop between the winding 51 and the coil 12. In FIGURE 6 the primary frequency determining network 50 is located between the armature 13 and the transformer winding 52. In FIGURE 7 the primary frequency determining element 50 is connected to a winding 50' which is coupled to the core 10, thereby introducing by transformation into the coil 12 the frequency determining characteristics of the loop.

The foregoing illustrations of FIGURES 4–7 are presented merely by way of illustration of the variations which are possible. In each case, however, it will be noted that there is provided for the transfer between the armature 13 and the coil 12 of currents which are exclusively alterating in character. No direct current feedback is provided. In each case the frequency of the currents or the voltages involved as the case may be are determined by the characteristic of the feedback loop and are independent of the speed at which the motor 15 drives the rotor 13. In accordance with the foregoing description emphasis has been placed upon a system in which there is provided a generator of alternating current.

Figure 8:
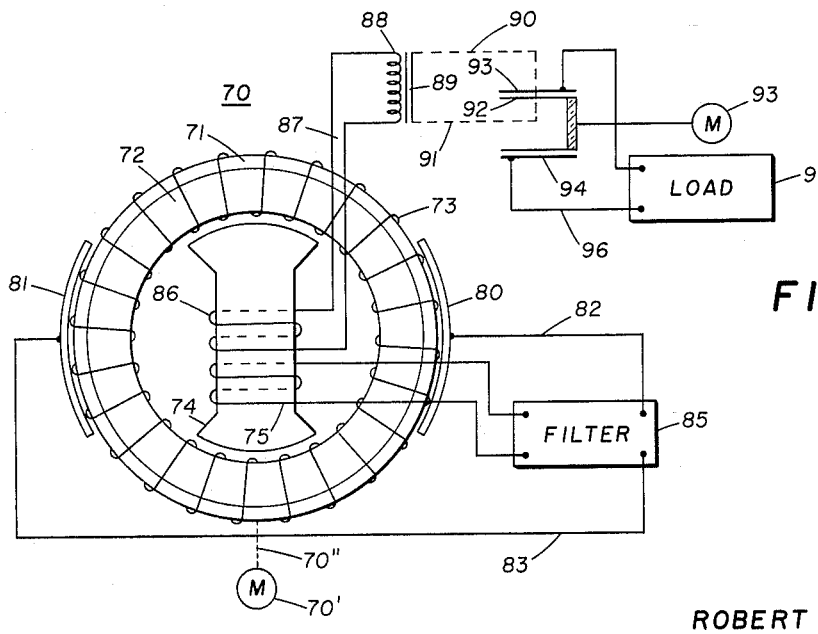
FIGURE 8 is an amplifier embodying the present invention.

It may be desirable to utilize the system of the present invention to provide for amplification of alternating currents employing energy introduced into the system by way of a rotational input with the frequency of the signals being amplified being independent of the speed of rotation. Such a system has been illustrated in FIGURE 8. In this system the armature 70 includes a cylindrical core 72 surrounded by an insulating tension bearing member 71. The winding 73 is spiraled around the cylinder walls in the form of a toroidally disposed winding. The system is provided with capacitive pick-off plates 80 and 81 which are connected by way of conductors 82 and 83, respectively, to the input of a filter device 85. The output of the filter 85 is connected to a winding 75 on the stator structure 74. A second winding 86 is provided on the stator which is connected by way of channel 87 to an input coil 88. The coil 88 may be considered to correspond with coil 12 of FIGURE 1. The core 89 corresponds with the core 10 of FIGURE 1 and is coupled, as indicated by the dotted lines 90 and 91, to a rotary element 92 which is driven by a motor 93. Capacitive pick-off plates 93 and 94 are connected by way of conductors 95 and 96 to a load unit 97. Thus, the oscillator unit involving the rotor 70 serves as an exciter for the amplifier unit which is driven by the motor 93. It is to be understood that the rotor 70 will be driven by a motor 70' which is linked to the rotor 70 by a shaft which has been generically represented by the dotted line 70". Relatively low power may be involved in the operation of the system involving rotor 70. However, as an exciter for the system driven by motor 93, substantial power outputs can be delivered to the load 97 at the frequency determined by the rotor 70 and at an energy controlled by the energy input from the motor 93. Thus, it will be seen that the invention involves a rotary system, an electromechanical system for transducing mechanical energy into electrical energy at a frequency independent of the speed of the rotating elements. In the form of a radiofrequency generator there is provided a rotating electrical machine having a prime mover connected thereto for supplying mechanical energy to the system and more specifically for rotating a driven element. An electrical network is provided which has a current path leading from the driven element. A frequency determining unit is provided in the network which is operable independently of the frequency of rotation of the driven element for determining frequency of currents flowing in the network. An output circuit is provided which is coupled to the network for delivery of energy at the frequency of said currents from said generator. In a preferred embodiment of the system, of course, the magnetic structures are formed from materials characterized by low losses, particular elements preferable for this operation being well-known to those skilled in the art in the form of ferro spinel materials which are ceramic materials of high magnetic permeability and low electrical conductivity.

Having described the invention in connection with certain specific embodiments thereof, it is to be understood that further modifications may now suggest themselves to those skilled in the art and it is intended to cover such modifications as fall within the scope of the appended claims.

What is claimed is:
1. An electromagnetic transducer which comprises:
 (a) a ferro spinel magnetic structure having high electrical resistivity formed in two parts, one part being a fixed stator and the other part a cylindrical rotor spaced from said stator with an air gap therebetween,
 (b) a closed circuit toroidal winding on said rotor,
 (c) means for supporting said rotor for rotation about its axis and including insulating structure symmetrical with respect to said axis having a rotational drive connection therefor,

(d) a plurality of conductive sector strips disposed about the periphery of said insulating structure extending parallel to said axis,
(e) connections between said conductive strips and the winding of said rotor,
(f) a field coil on said stator,
(g) means for capacitively coupling the terminals of said coil to said conductive strips on said rotor for self-excitation of said transducer,
(h) the circuit of said coil being tuned to a frequency in the radio frequency range for operation at said frequency with minimal internal losses in said ferro spinel magnetic structure, and
(i) a coil linking the magnetic field in said transducer for delivering radio frequency energy therefrom.

2. An electromagnetic transducer which comprises:
(a) a ferro spinel magnetic structure having high electrical resistivity formed in two parts, one part being a fixed stator and the other part a cylindrical rotor spaced from said stator with an air gap therebetween,
(b) a closed circuit toroidal winding on said rotor,
(c) means for encompassing and supporting said rotor for rotation about its axis and including insulating structure symmetrical with respect to said axis having a rotational drive connection therefor,
(d) a plurality of conductive sector strips disposed about the periphery of said insulating structure extending parallel to said axis,
(e) connections between each of said conductive strips and the winding of said rotor,
(f) a field coil on said stator,
(g) means for capacitively coupling the terminals of said coil to said conductive strips on said rotor for self-excitation of said transducer,
(h) the circuit of said coil being tuned to a frequency in the radio frequency range for operation at said frequency with minimal internal losses in said ferro spinel magnetic structure, and
(i) a coil linking the magnetic field in said transducer for delivering radio frequency energy therefrom.

3. An electromagnetic transducer which comprises:
(a) a ferro spinel magnetic structure having high electrical resistivity formed in two parts, one part being a fixed stator and the other part a cylindrical rotor spaced from said stator with an air gap therebetween,
(b) a closed circuit toroidal winding on said rotor,
(c) tensile bands which encompass said rotor,
(d) means for supporting said rotor for rotation about its axis and including insulating structure symmetrical with respect to said axis having a rotational drive connection therefor,
(e) a plurality of conductive sector strips disposed about the periphery of said insulating structure extending parallel to said axis,
(f) connections between each of said conductive strips and the winding of said rotor,
(g) a field coil on said stator,
(h) means for capacitively coupling the terminals of said coil to said conductive strips on said rotor for self-excitation of said transducer,
(i) the circuit of said coil being tuned to a frequency in the radio frequency range for operation at said frequency with minimal internal losses in said ferro spinel magnetic structure, and
(j) a coil linking the magnetic field in said transducer for delivering radio frequency energy therefrom.

4. An electromagnetic transducer which comprises:
(a) a ferro spinel magnetic rotor and a ferro spinel magnetic stator spaced apart with an air gap therebetween,
(b) a tension-bearing member encircling said rotor,
(c) means for driving said rotor at a high speed,
(d) a toroidally wound coil on said rotor,
(e) a fixed coil on said stator,
(f) means including frequency-determining means for interconnecting the coils for positive feedback at the determined frequency, and
(g) output circuit means coupled to said stator for amplifying signals derived from said stator at said frequency.

5. The combination set forth in claim 4 in which a second transducer is connected in said output circuit means and includes a motor-driven rotor magnetically coupled to a stator excited by said signals.

References Cited by the Examiner
UNITED STATES PATENTS

| | | | |
|---|---|---|---|
| 1,660,084 | 2/1928 | Morton | 322—61 |
| 2,426,199 | 8/1947 | Gould | 310—219 |
| 2,460,714 | 2/1949 | Roys | 322—61 |
| 2,528,111 | 10/1950 | Buckthal | 322—61 |
| 2,760,127 | 8/1956 | Duncan et al. | 317—250 |

OTHER REFERENCES

Graf: Modern Dictionary of Electronics, H. W. Sams & Company Incorporated, January 1962.

LLOYD McCOLLUM, *Primary Examiner.*

ROBERT L. SIMS, *Examiner.*